United States Patent Office 3,108,124
Patented Oct. 22, 1963

3,108,124
METHOD FOR MANUFACTURE OF 5-CHLORO-2,4-BIS(METHYLSULFAMYL)-ANILINE
Warren James Close, Waukegan, Ill., assignor to Abbott Laboratories, North Chicago, Ill., a corporation of Illinois
No Drawing. Filed July 28, 1961, Ser. No. 127,512
2 Claims. (Cl. 260—397.7)

This invention relates to a novel method for the manufacture of 5-chloro-2,4-bis(methylsulfamyl)-aniline having the formula

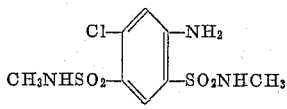

which is an important intermediate for the manufacture of the diuretic and antihypertensive agent 2-methyl-3-chloromethyl - 6 - chloro - 7 - sulfamyl - 3,4 - dihydro - 1,2,4-benzothiadiazine-1,1-dioxide. In such use, the aniline compound is refluxed with methyl dimethoxyacetate in water solution to produce 3-carboxy-6-chloro-2-methyl-7 - methylsulfamyl - 3,4 - dihydro - 1,2,4 - benzothiadiazine-1,1-dioxide which is then reacted as described in my copending application U.S. Serial No. 47,915, filed on August 8, 1960, according to the following series of reactions:

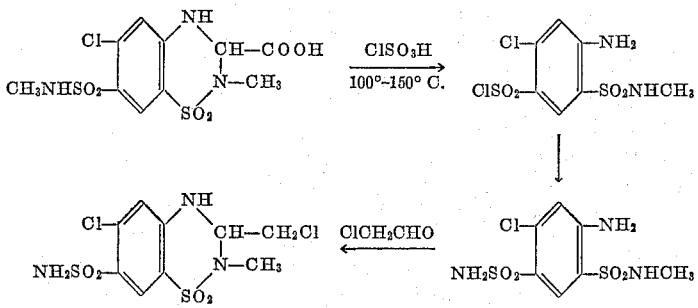

The classical method for preparing 5-chloro-2,4-bis(methylsulfamyl)-aniline is to react meta-chloroaniline with chlorosulfonic acid to obtain 5-chloroaniline-2,4-disulfonyl chloride which is thereafter reacted with methylamine to obtain the desired product.

It has now been discovered quite unexpectedly that 4,6-dichloro-1,3-bis(methylsulfamyl)-benzene can be reacted directly with urea without cyclization to obtain 5-chloro-2,4-bis(methylsulfamyl)-aniline in good yields.

The following example illustrates this novel process but is not to be construed as limiting.

*Example 1*

4,6-dichloro-1,3-bis(methylsulfamyl)-benzene (3.3 g., 0.01 mole) prepared as described in the Journal of Pharmacy and Pharmacology, 12, 497 (1960), and melting at 187° C. was mixed with 12 g. (0.2 mole) of urea and heated at 200°–210° C. for 90 minutes. The cooled reaction mixture was then treated with water and the solid which formed was separated by filtration. Upon crystallization from aqueous methanol, the desired 5-chloro-2,4-bis(methylsulfamyl)-aniline was obtained as a white, crystalline solid melting at 175°–177° C.

What is claimed is:
1. A method for the preparation of 5-chloro-2,4-bis(methylsulfamyl)-aniline which comprises reacting 4,6-dichloro-1,3-bis(methylsulfamyl)-benzene with urea at a temperature of about 200° C. and recovering the resulting product from the reaction mixture.
2. A method as claimed in claim 1 in which a stoichiometeric excess of urea is employed.

References Cited in the file of this patent
UNITED STATES PATENTS

| | | |
|---|---|---|
| 2,358,465 | McNally et al. | Sept. 19, 1944 |
| 2,506,224 | Kopp et al. | May 2, 1950 |
| 2,835,702 | Schultz | May 20, 1958 |

OTHER REFERENCES
Fischer: "Deutsche Chemische Gesellschaft Berichte," volume 24, pages 3785–3808 (1891).
Buhler: "Chemical Abstracts," volume 45, page 5116h (1951).
Noller: "Chemistry of Organic Compounds," published by W. B. Saunders Co., page 301 (1951).
Bourdois et al.: "Bull. Soc. Chim. France," 1961, pages 550–553